United States Patent [19]

Nakamura

[11] Patent Number: 5,970,219

[45] Date of Patent: Oct. 19, 1999

[54] METHOD OF OUTPUTTING PAGE DATA IN APPLICATIONS PROGRAMS-INTEGRATING ENVIRONMENT AND AN APPARATUS FOR THE SAME

[75] Inventor: Norihiko Nakamura, Kyoto, Japan

[73] Assignee: Dainippon Screen Mfg. Co., Ltd., Kyoto, Japan

[21] Appl. No.: 08/882,343

[22] Filed: Jun. 25, 1997

[30] Foreign Application Priority Data

Jun. 28, 1996 [JP] Japan .................................. 8-188374

[51] Int. Cl.$^6$ ........................................................ G06F 9/00
[52] U.S. Cl. ........................ 395/114; 395/114; 395/115; 707/500; 707/900; 707/902; 707/911; 382/260; 382/302; 382/180
[58] Field of Search .................................... 395/114, 115; 707/500–542, 900–911; 382/302, 260, 180

[56] References Cited

U.S. PATENT DOCUMENTS 5,727,220 3/1998 Hohensee et al. ..................... 395/774

Primary Examiner—Scott Rogers
Assistant Examiner—Lance W. Sealey
Attorney, Agent, or Firm—McDermott, Will & Emery

[57] ABSTRACT

The present invention provides a method of outputting page data representing a one-page image generated by an image-integrating applications program, upon condition that parts data generated by a link applications program are accurately reproduced and incorporated in the page data, as well as an output system for the same. A first applications program generates first parts-describing data, which describe an image of a first image part, from internal data representing the one-page image. When the first applications program detects the existence of a second image part in the internal data, an instruction is given to a second applications program to generate parts-describing data for describing an image of the second image part. The second applications program then generates second parts-describing data, which describe the image of the second image part, in response to the instruction. PDL data representing the one-page image are eventually generated, based on the first parts-describing data and the second parts-describing data.

14 Claims, 15 Drawing Sheets

Fig. 6

SetFont ("Helvetica")
SetOffset (0, 100)          ⎤ FIRST PART
ShowChar ("ABC")

SetColor (0, 0, 600, 400)   ⎤ SECOND PART
DrawRect (400, 100, 600, 300)

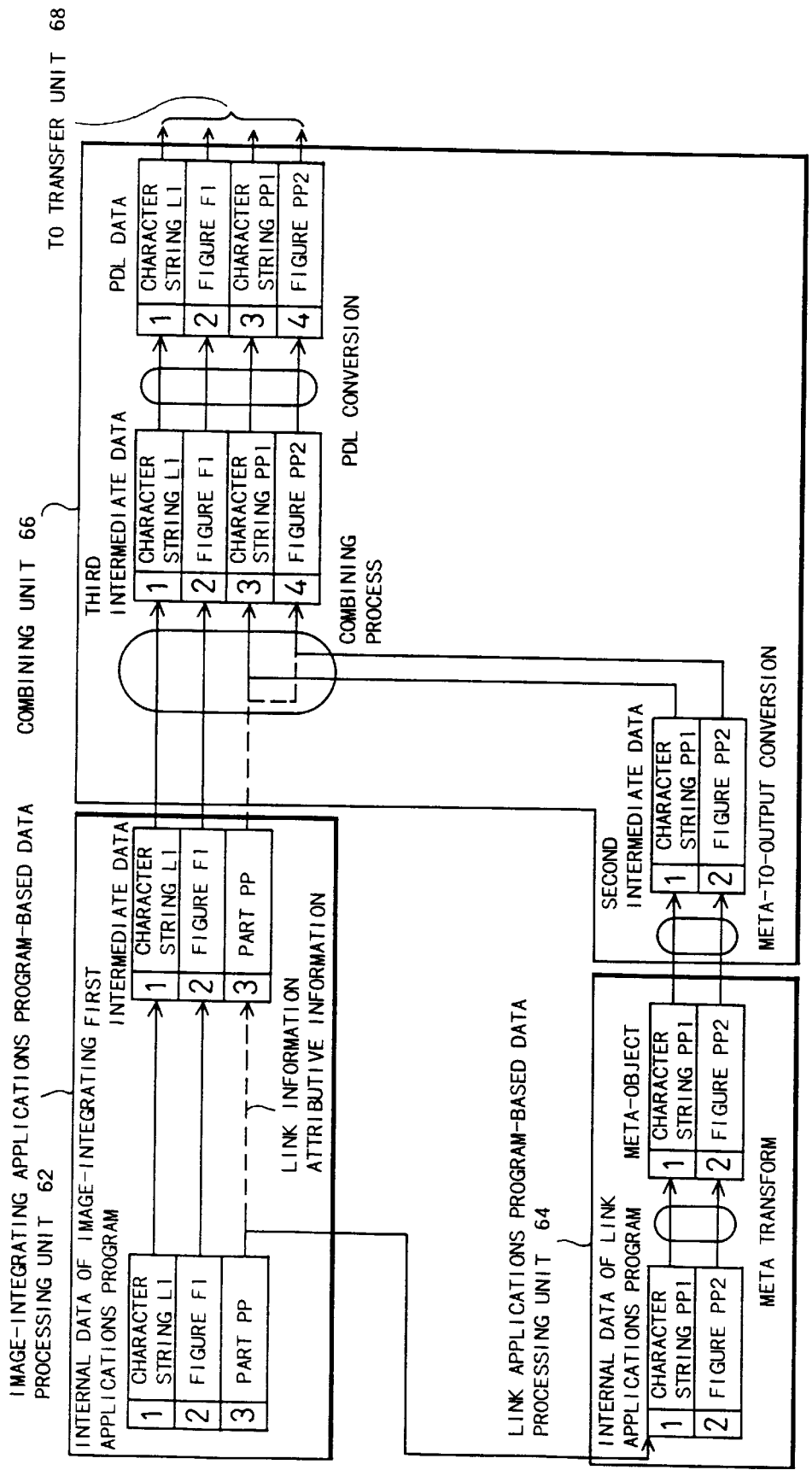

Fig. 10A
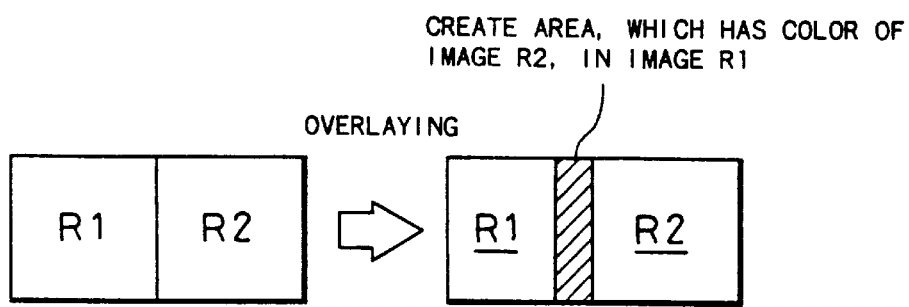
Fig. 10B COLOR FRAMING
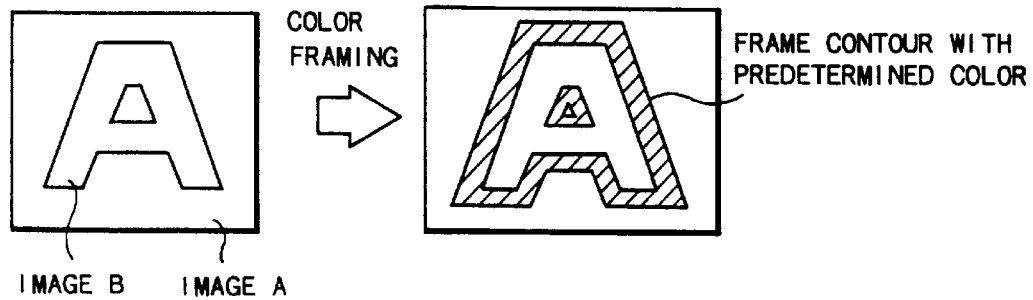

(INFORMATION REPRESENTING PARTS PP AND F1 INVOLVED IN COLOR FRAMING AND INFORMATION ON WIDTH AND COLOR OF COLOR FRAMES)

METHOD OF OUTPUTTING PAGE DATA IN APPLICATIONS PROGRAMS-INTEGRATING ENVIRONMENT AND AN APPARATUS FOR THE SAME

BACKGROUND OF THE INVENTION

1. Field of the Invention

The present invention relates to a method of outputting page data, which represents a one-page image, by an applications program (an image-integrating applications program) that integrates images of parts data generated by a plurality of applications programs mounted on the computer, and an apparatus for the same. More specifically the present invention pertains to a method of outputting page data representing a one-page image generated by an image-integrating applications program, upon condition that parts data generated by another applications program are accurately reproduced and incorporated in the page data, as well as to an apparatus for the same.

2. Description of the Prior Art

A multitasking operating system (OS) that can execute a plurality of tasks in parallel or in combination is generally applied to computers including personal computers and work stations. The multitasking OS generally has a function of linking data between a plurality of tasks; for example, OLE (trade mark by Microsoft Corporation) on Microsoft Windows (trade mark by Microsoft Corporation, hereinafter simply referred to as Windows) or OpenDoc (trade mark by Apple Computer Inc.) on Macintosh (trademark by Apple Computer Inc.). These functions enable parts data generated by a plurality of applications programs to be integrated and processed.

By way of example, typical applications programs for Windows include Microsoft Word (trade mark by Microsoft Corporation) for word processing and Microsoft Excel (trade mark by Microsoft Corporation) for spreadsheet. The data link function can link the graphics and charts data generated by the spreadsheet with the text data generated by the word processing program, thereby generating one-page data including text data and graphics and charts data. The applications program that can generate a one-page image including image parts embedded there in, which are generated by another applications program (the word processing program in the above example) is hereinafter referred to as the 'image-integrating applications program'. The applications program that has generated the embedded image parts to be linked (the spreadsheet in the above example) is hereinafter referred to as the 'link applications program'.

When page data generated by an image-integrating applications program are converted to a PDL (page description language) and a one-page image expressed by the page data is output by an output device, such as a printer, the image parts processed by the image-integrating applications program, which actually carries out the output, are accurately described in the PDL and output. Data of the link applications program are converted to a data format usable by the image-integrating applications program and output as the data of the image-integrating applications program. Image data, such as bit-map data, corresponding to the output resolution of the computer are generally supplied from the link applications program to the image-integrating applications program. This procedure causes the embedded or linked parts data (figures and characters) of the link applications program not to be fully expressed in their original resolution, thereby deteriorating the image quality.

SUMMARY OF THE INVENTION

The object of the present invention is thus to output page data representing a one-page image and generated by an image-integrating applications program, upon condition that parts data generated by a link applications program are accurately reproduced and incorporated in the page data.

At least part of the above and the other related objects is realized by a method of outputting page data representing a one-page image in a format of PDL data, upon condition that the one-page image is generated by a first applications program. The one-page image includes a first image part processed by the first applications program and a second image part processed by a second applications program. The method of the present invention includes the steps of: (a) generating, by means of the first applications program, first parts-describing data from internal data generated by the first applications program representing the one-page image, the first parts-describing data describing an image of the first image part; (b) when the first applications program detects the existence of the second image part in the internal data, giving an instruction to the second applications program to generate second parts-describing data for describing an image of the second image part; (c) generating, by means of the second applications program, the second parts-describing data describing the image of the second image part in response to the instruction; and (d) generating one-page PDL data representing the one-page image based on the first parts-describing data and the second parts-describing data.

The 'parts-describing data' denote data describing image parts, such as characters and figures, by each part. Typical examples of the parts-describing data are PDL data and 'metafiles', which is used in Windows operating system. The parts-describing data reproduce the image parts, such as characters and figures, irrespective of the resolution of the output device. Image expansion using the parts-describing data according to the resolution of the output device enables accurate reproduction of characters and figures. Parts-describing data representing picture parts, such as a natural image, include bit-map data. The method of the present invention can convert the bit-map data according to the resolution of the output device.

The method of the present invention enables the second image part generated by the second applications program to be transferred to the first applications program in the format of parts-describing data. This enables accurate outputs of characters and figures and an output of pictures with the varying resolution according to the requirements, thereby realizing high-quality outputs on the devices having different resolutions and different performances. In the course of outputting page data representing a one-page image generated by the first applications program, the method of the present invention enables an image part generated by the second applications program incorporated in the one-page image to be accurately reproduced and output.

In accordance with one embodiment, the step (d) includes the step of: generating a PDL data section for the second image part to be incorporated in the one-page PDL data, based on information indicative of the second image part in the one-page image as well as on the second parts-describing data, the information being output from the first applications program.

This structure enables the PDL data section of the second image part to be readily generated in the PDL data representing the one-page image, based on the information.

In accordance with another embodiment, the first parts-describing data have a data format of PDL data and the second parts-describing data have a data format of a metafile. In this application, the step (d) includes the steps of:

converting the second parts-describing data to a PDL data section; and generating the one-page PDL data by arranging a PDL data section corresponding to the first parts-describing data and the PDL data section of the second image part.

The metafile is an example of the parts-describing data and can thus be converted to PDL data. The PDL data representing the one-page image can be generated by arranging the PDL data section of the second image part thus generated with the PDL data section of the first image part.

In accordance with still another embodiment, the first parts-describing data are first parts intermediate data having a predetermined intermediate data format, which is different from the format of the PDL data, and the second parts-describing data have a data format of a metafile. In this application, the step (d) includes the steps of: (1) converting the second parts-describing data to second parts intermediate data having the predetermined intermediate data format; (2) generating page image intermediate data representing the one-page image by arranging the first parts intermediate data and the second parts intermediate data; and (3) converting the page image intermediate data to the one-page PDL data.

The first image part and the second image part are converted to the intermediate data having the common intermediate data format. The PDL data representing the one-page image are then generated from the intermediate data.

In accordance with one embodiment, the first parts intermediate data include information indicative of the second image part in the one-page image. The step (2) preferably includes the step of: generating the second parts intermediate data included in the page image intermediate data, based on the information indicative of the second image part in the first parts intermediate data, as well as on the second parts intermediate data.

This structure enables the intermediate data of the second image part to be readily generated in the intermediate data representing the one-page image, based on the information.

In accordance with another embodiment, the internal data representing the one-page image includes image processing effect information representing a predetermined image processing effect given between the first image part and the second image part. The step (2) preferably includes the step of: incorporating the image processing effect information into the page image intermediate data.

The 'image processing effect' denotes an effect obtained by the processing, such as 'overlaying' or 'color framing'. Provided that the image processing effect information representing such an image processing effect is incorporated in the page image intermediate data, conversion of the page image intermediate data to the PDL data gives the PDL data of the one-page image with the image processing effects faithfully reflected.

The present invention is also directed to a page data output apparatus for outputting page data representing a one-page image in a format of PDL data, upon condition that the one-page image is generated by a first applications program and includes a first image part processed by the first applications program and a second image part processed by a second applications program. The page data output apparatus of the present invention includes: first data processing means for generating first parts-describing data, which describe an image of the first image part, from internal data of the first applications program representing the one-page image, and for, when the existence of the second image part in the internal data is detected, giving an instruction to the second applications program to generate second parts-describing data for describing an image of the second image part; second data processing means for generating the second parts-describing data describing the image of the second image part in response to the instruction; and combining means for generating one-page PDL data representing the one-page image based on the first parts-describing data and the second parts-describing data.

The present invention is further directed to a computer program product for processing an image. The computer program product of the present invention includes: a computer readable medium; and first applications program code means stored on the computer readable medium. The first applications program code means includes: program code means for causing a computer to generate internal data representing a one-page image, which comprise a first image part generated by the first applications program code means and a second image part generated by second applications program code means; program code means for causing the computer to generate first parts-describing data describing the first image part from the internal data; program code means for causing the computer to detect an image part included in the internal data; program code means for, when the existence of the second image part in the internal data is detected, causing the computer to give an instruction to the second applications program code means to generate parts-describing data describing an image of the second image part; and program code means for causing the computer to generate page description language-program data representing the one-page image based on second parts-describing data as well as on the first parts-describing data in response to the instruction the second parts-describing data describing the image of the second image part.

These and other objects, features, aspects, and advantages of the present invention will become more apparent from the following detailed description of the preferred embodiments with the accompanying drawings.

BRIEF DESCRIPTION OF THE DRAWINGS

FIG. 6 shows an example of meta-objects of the part PP generated by the link applications program;

FIG. 7 shows a detailed flow of data in the page data output process carried out at step S2 in the flowchart of FIG. 3 in a second embodiment;

FIGS. 10A and 10B show examples of image processing effects;

DESCRIPTION OF THE PREFERRED EMBODIMENTS

Figure 1:
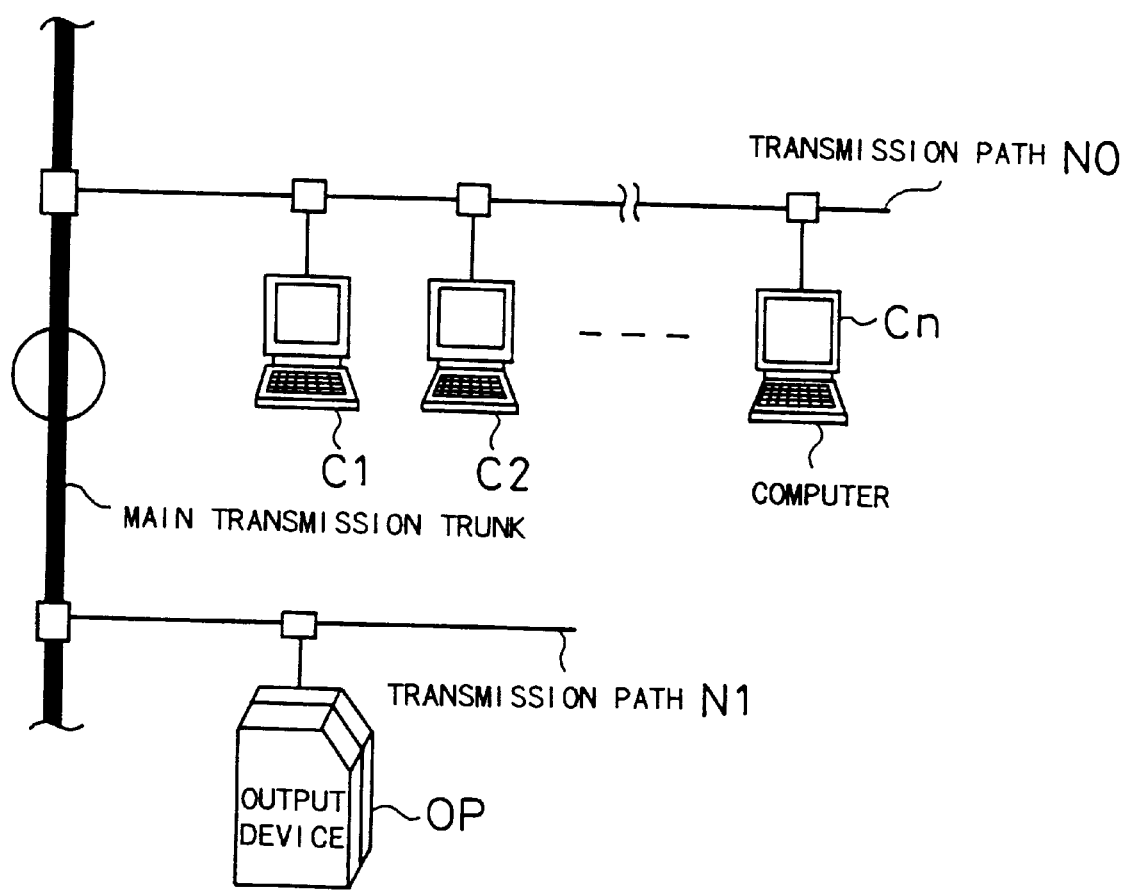
FIG. 1 is a block diagram illustrating a page data output system embodying the present invention.
Figure 2:
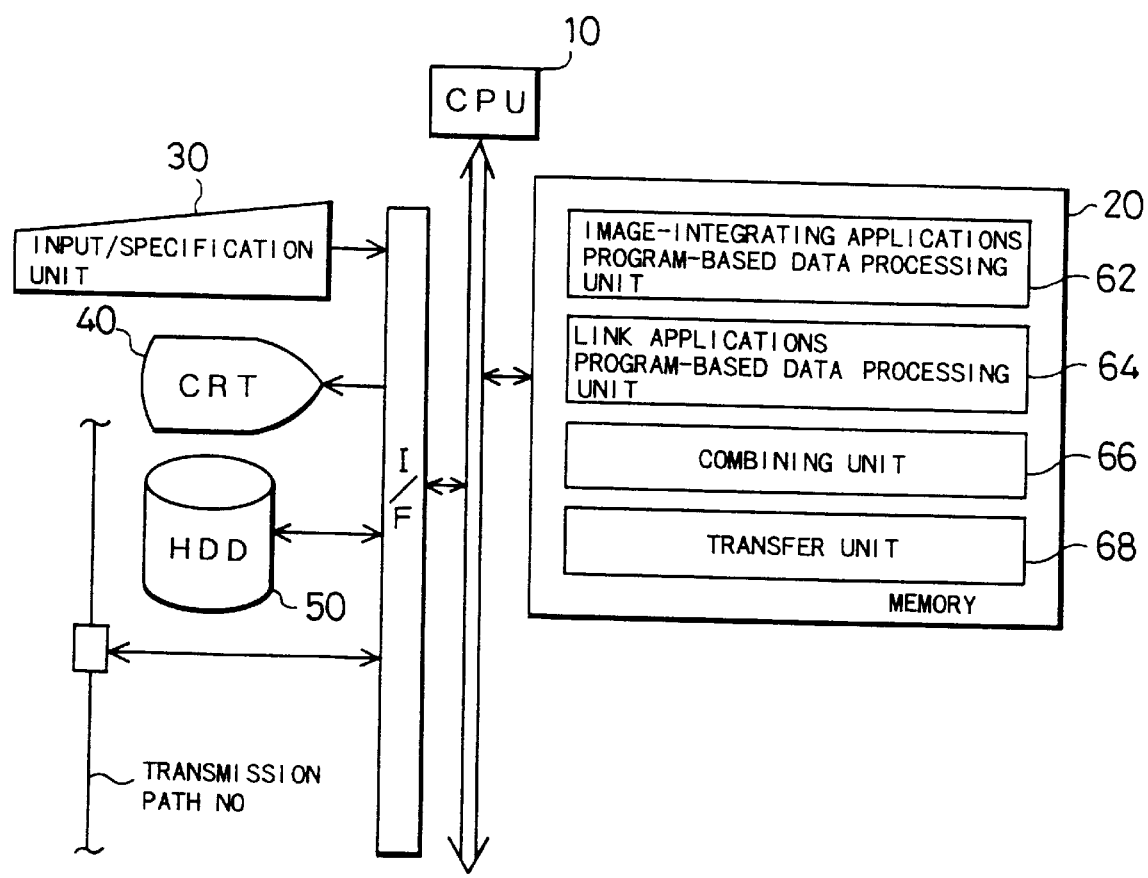
FIG. 2 shows an exemplified structure of a computer.

Some modes of carrying out the present invention are described below as preferred embodiments. FIG. 1 is a block diagram illustrating a page data output system embodying the present invention. The page data output system of FIG. 1 is constructed as a network system in which transmission paths N0 and N1 are connected to a main transmission trunk. While a plurality of computers C1 through Cn are connected to the transmission path N0, an output device OP is connected to the transmission path N1. The computers C1 through Cn represent general computer systems, an exemplified structure of which is shown in FIG. 2. The computer includes a CPU 10, a memory 20 for storing software, that is, programs to be executed, (generally a plurality of) input/specification unit 30 including a keyboard, a mouse, and a tablet, a CRT (monitor) 40 functioning as a display device, a hard disk drive 50 as external storage unit, and an interface I/F.

The memory 20 stores software programs realizing the respective functions of image-integrating applications program-based data processing unit 62 for processing parts data generated by an image-integrating applications program, link applications program-based data processing unit 64 for processing parts data generated by a link applications program, combining unit 66 for combining the data processed by the image-integrating applications program-based data processing unit 62 with the data processed by the link applications program-based data processing unit 64, and transfer unit 68 for transferring page data to the output device OP. The CPU 10 executes the programs to implement these units. Namely the CPU 10 executes the image-integrating applications program to realize the image-integrating applications program-based data processing unit 62, and executes the link applications program to realize the link applications program-based data processing unit 64. The functions of the combining unit 66 and the transfer unit 68 may be included in the image-integrating applications program-based data processing unit 62. The CPU 10 carries out the functions of the image-integrating applications program-based data processing unit 62, the link applications program-based data processing unit 64, and the combining unit 66, in order to enable the resulting page data to be output to the output device OP. The resulting page data processed by the respective processing units 62, 64, and 66 are transmitted to the transmission path N0 and then to the main transmission trunk (shown in FIG. 1) by the function of the transfer unit 68. The page data transmitted to the main transmission trunk are further transmitted to the transmission path N1 and eventually to the output device OP for output. The software (applications program) implementing these functions may be stored in a portable storage medium (carriable storage medium), such as floppy disks and CD-ROMs, and transferred from the portable storage medium to the memory 20 or the hard disk drive 50.

The image-integrating applications program and the link applications program are discussed below as examples of the applications programs executed by the computer. The following example refers to an example using only one link applications program, although a plurality of link applications programs may be used in some embodiments.

Figure 3:
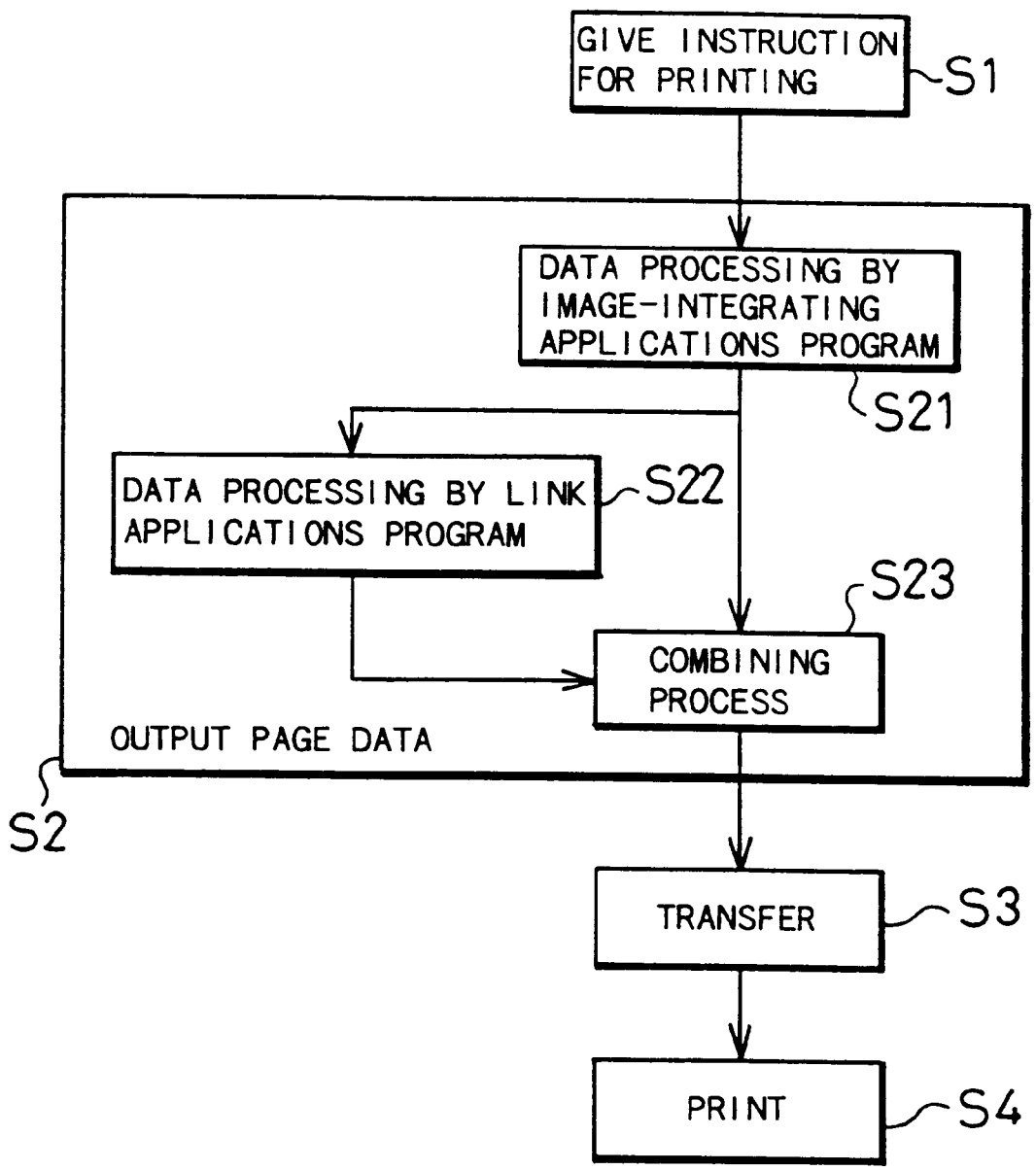
FIG. 3 is a flowchart showing a processing routine executed in the embodiment of the present invention.

FIG. 3 is a flowchart showing a processing routine executed in the embodiment of the present invention. When the program enters the processing routine of FIG. 3, in response to an instruction for printing given at step S1, output of one-page data starts at step S2. In the page data output process, parts to be processed by the image-integrating applications program and other parts (objects) generated by the link applications program are processed separately. In accordance with a concrete procedure, the image-integrating applications program-based data processing unit 62 carries out a first output operation (discussed later) at step S21 for the parts to be processed by the image-integrating applications program. In case that a certain part generated by the link applications program is detected in the course of the first output operation at step S21, the processing of the certain part is entrusted to the link applications program. The link applications program-based data processing means 64 carries out a second output operation (discussed later) at step S22 for the parts generated by the link applications program. At step S23, the combining unit 66 combines the output data separately processed at steps S21 and S22 and outputs the resulting data as one-page data (PDL data). The one-page data output at step S2 are transferred to the output device OP at step S3 and printed out by the output device OP at step S4.

The details of the processes carried out at step S2 in the processing routine of FIG. 3 are characteristic of the present invention and discussed below.

Figure 4:
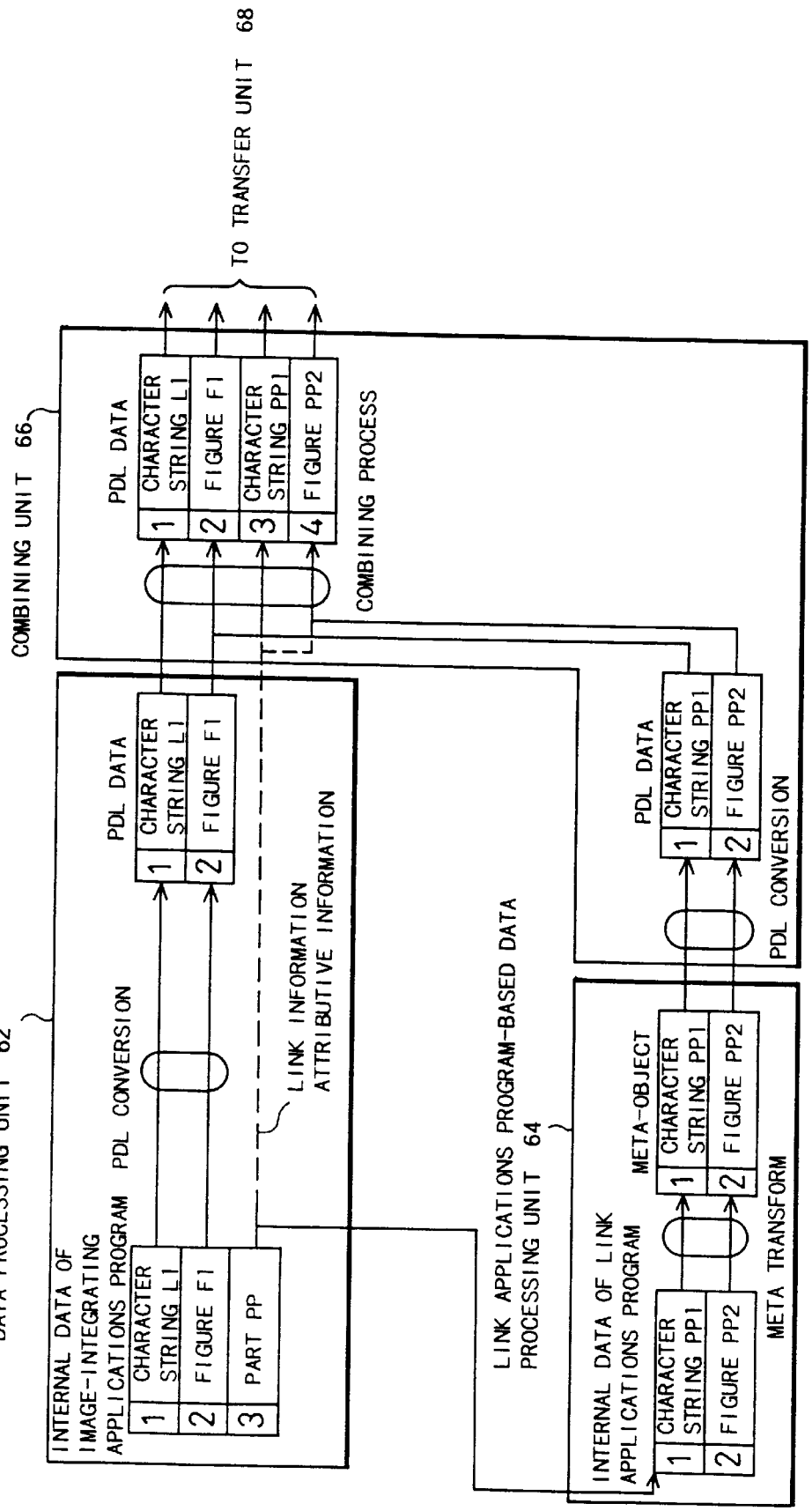
FIG. 4 shows a detailed flow of data in the page data output process carried out at step S2 in the flowchart of FIG. 3 as a first embodiment.
Figure 5:
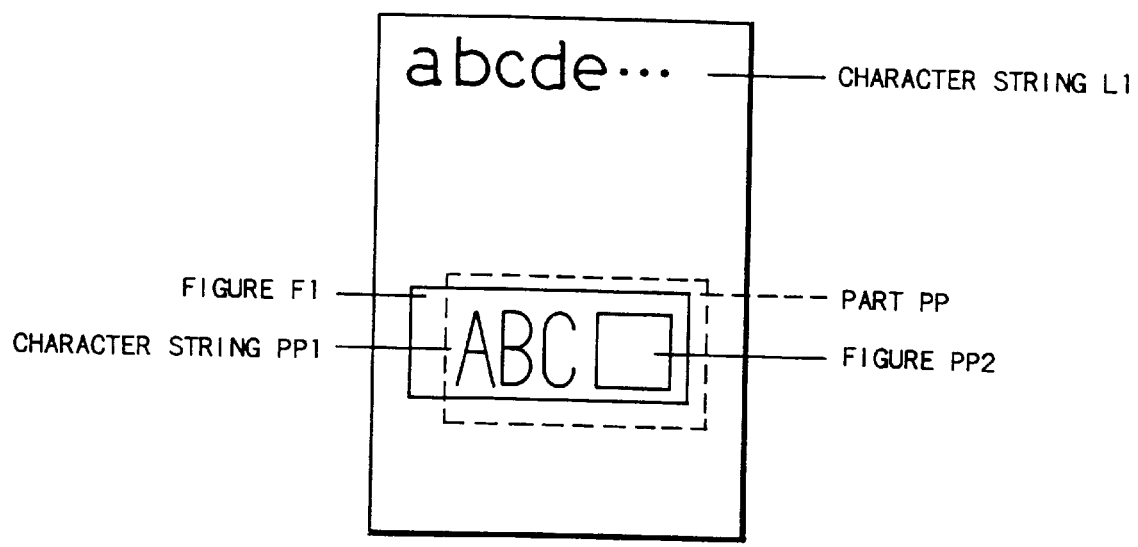
FIG. 5 illustrates a one-page image including a character string L1 and a figure F1, which are parts generated by the image-integrating applications program, and a part PP generated by the link applications program.

A. First Embodiment:

FIG. 4 shows a detailed flow of data in the page data output process carried out at step S2 in the flowchart of FIG. 3 as a first embodiment. FIG. 4 refers to on embodiment where one-page data representing a one-page image shown in FIG. 5 are printed out. FIG. 5 illustrates a one-page image including a character string L1 and a figure F1, which are parts generated by the image-integrating applications program, and a part PP generated by the link applications program. The part PP consists of a character string PP1 and a figure PP2. Referring to FIG. 4, internal data of the image-integrating applications program representing the one-page image shown in FIG. 5 include three sets of data representing the character string L1, the figure F1, and the part PP, respectively. The first internal data representing the part PP include link information indicative of a linkage with the link applications program and part data representing the part PP in a data format of the link applications program.

When the user gives an instruction to print out a one-page image, the image-integrating applications program-based data processing unit 62 starts the output process of the internal data in the sequence of the character string L1, the figure F1, and the part PP. At this moment, the internal data of the character string L1 and the figure F1, which are the embedded or linked parts to be processed by the image-integrating applications program, are converted to PDL data described in a PDL (page description language) by the image-integrating applications program-based data processing unit 62. When the image-integrating applications program-based data processing unit 62 detects link information included in the internal data of the part PP, the output operation of the internal data of the part PP is entrusted to the link applications program-based data processing unit 64. The link applications program-based data processing unit 64 respectively transforms the character string PP1 and the figure PP2 included in the internal data of the part PP to meta-objects (described later). The combining unit 66 then converts the meta-objects to PDL data. The PDL data representing the character string PP1 and the figure PP2 are combined with the PDL data representing the character string L1 and the figure F1, so that one-page data described in the PDL are generated. As shown in FIG. 4, in the resulting one-page data, the PDL data representing the character string L1, the figure F1, the character string PP1, and the figure PP2 are arranged in this sequence. Namely the data representing one part PP included in the internal data of the image-integrating applications program are replaced by the PDL data representing the character string PP1 and the figure PP2. The resulting one-page data are transferred to the output device OP by the transfer unit 68 and actually printed out by the output device OP.

The first embodiment is characterized by the process of transforming the internal data of the part PP generated by the link applications program to meta-objects in a metafile format (meta transform) in the course of the output operation and then converting the meta-objects to PDL data. The metafile format is a data format expressed in an object code that one-to-one maps to a drawing function, which is a graphics drawing routine of the multitasking OS. The meta-objects in the metafile format are the data which can reproduce the part accurately in high resolution. The multitasking OS is, for example, Windows by Microsoft Corporation and the drawing function corresponds to a GDI (graphic device interface).

FIG. 6 shows an example of meta-objects of the part PP generated by the link applications program. The first three lines represent an example of the character string PP1, which is the first part, whereas the last two lines represent an example of the figure PP2, which is the second part. Although the actual meta-objects are expressed by the object code, the examples of FIG. 6 are expressed by a format described in the corresponding GDI function for convenience of illustration. The first line defines a font of the character string PP1, the second line specifies a location of the character string PP2, and the third line represents the actual character string PP1. The fourth line specifies a color of the figure PP2, and the fifth line represents the figure PP2 described in the function. The metafile expresses the data, such as character string and figures, in the object code corresponding to the drawing function, and is thus device-independent. The metafile can accordingly realize high-quality outputs on the devices having different resolutions and different performances. Like the PDL, the metafile is object-oriented parts data representing an image of the part. This implies that the metafile of each part can be converted to PDL data.

Referring back to FIG. 4, the combining unit 66 carries out the PDL conversion of the meta-objects, so as to generate PDL data representing the respective parts (the character string PP1 and the figure PP2). The combining unit 66 then adds the PDL data representing the character string PP1 and the figure PP2 after the PDL data representing the character string L1 and the figure F1 sent from the image-integrating applications program-based data processing unit 62, in order to combine them. The image-integrating applications program-based data processing unit 62 gives information showing a location, in which the data of the part PP are to be inserted, in the form of the PDL data to the combining unit 66. The PDL data of the character string PP1 and the figure PP2 are inserted in this location. This procedure enables the PDL data representing the respective parts L1, F1, PP1, and PP2 to be arranged in this sequence and output.

As discussed above, in the process of outputting page data of a one-page image generated by the image-integrating applications program, the structure of the first embodiment can accurately reproduce and incorporate the parts data generated by the link applications program in the one-page image.

B. Second Embodiment

FIG. 7 shows a detailed flow of data in the page data output process carried out at step S2 in the flowchart of FIG. 3 in a second embodiment. FIG. 7 refers to another embodiment where one-page data representing a one-page image and shown in FIG. 5 are printed out.

When the user gives an instruction to print out a one-page image, the image-integrating applications program-based data processing unit 62 starts the output process of the internal data in the sequence of the character string L1, the figure F1, and the part PP. The output data are converted to first intermediate data (described later) prior to being converted to PDL data described in the PDL. When the image-integrating applications program-based data processing unit 62 detects link information included in the internal data of the part PP, the output operation of the internal data of the part PP is entrusted to the link applications program-based data processing unit 64. The link applications program-based data processing unit 64 respectively transforms the character string PP1 and the figure PP2 included in the internal data of the part PP to the meta-objects. The combining unit 66 then converts the meta-objects to second intermediate data (described later). The second intermediate data representing the character string PP1 and the figure PP2 are combined with the first intermediate data representing the character string L1 and the figure F1, so that one-page intermediate data (third intermediate data) are generated. As shown in FIG. 7, in the resulting one-page intermediate data, the data representing the character string L1, the figure F1, the character string PP1, and the figure PP2 are arranged in this sequence. Namely the data representing one part PP included in the internal data of the image-integrating applications program are replaced by the intermediate data representing the character string PP1 and the figure PP2. The resulting one-page intermediate data (third intermediate data) are further converted to PDL data expressed in the PDL. The one-page PDL data are then transferred to the output device OP by the transfer unit 68 and actually printed out by the output device OP.

The second embodiment is characterized by the process of respectively converting the parts data processed by the image-integrating applications program to the first intermediate data and the other parts data generated by the link applications program to the second intermediate data that have a common data structure with the first intermediate data, combining these two intermediate data, and converting the combined intermediate data to PDL data. The intermediate data may be any object-oriented data describing an image of each part and have an arbitrary data structure.

Figure 8A:
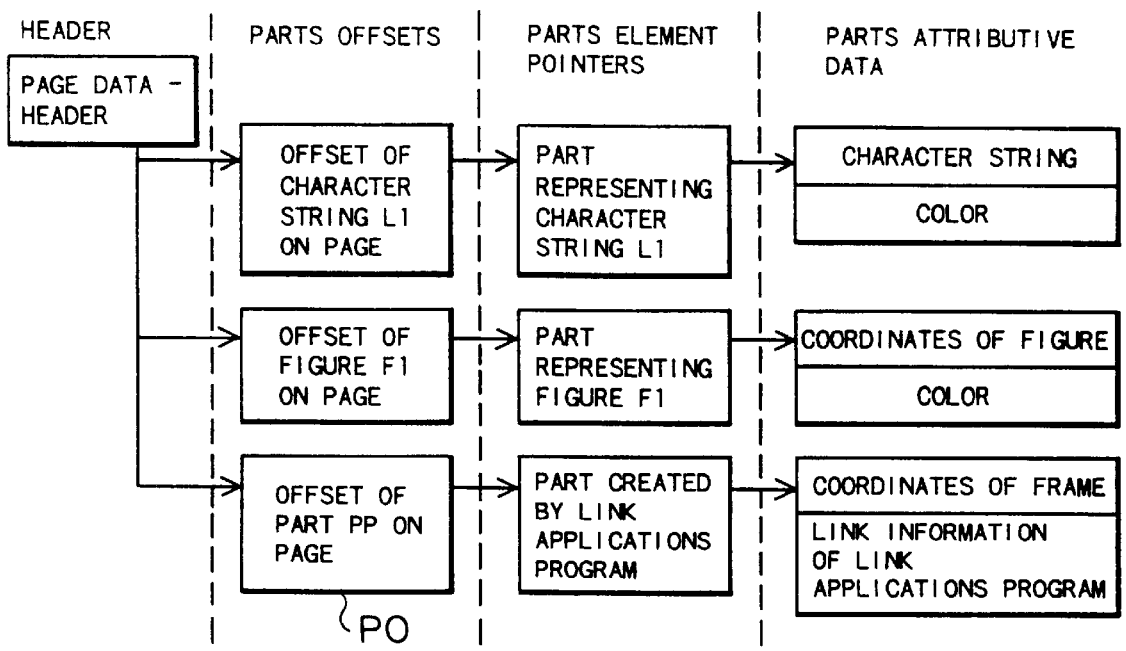
FIG. 8A illustrates an exemplified structure of first intermediate data processed by the image-integrating applications program in the second embodiment.
Figure 8B:
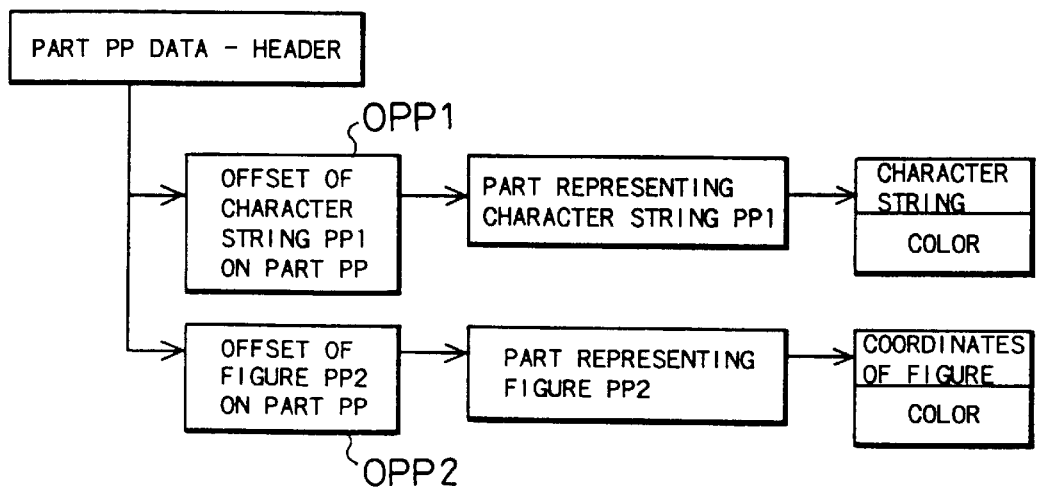
FIG. 8B illustrates an exemplified structure of second intermediate data of the part PP generated by the link applications program in the second embodiment.
Figure 9:
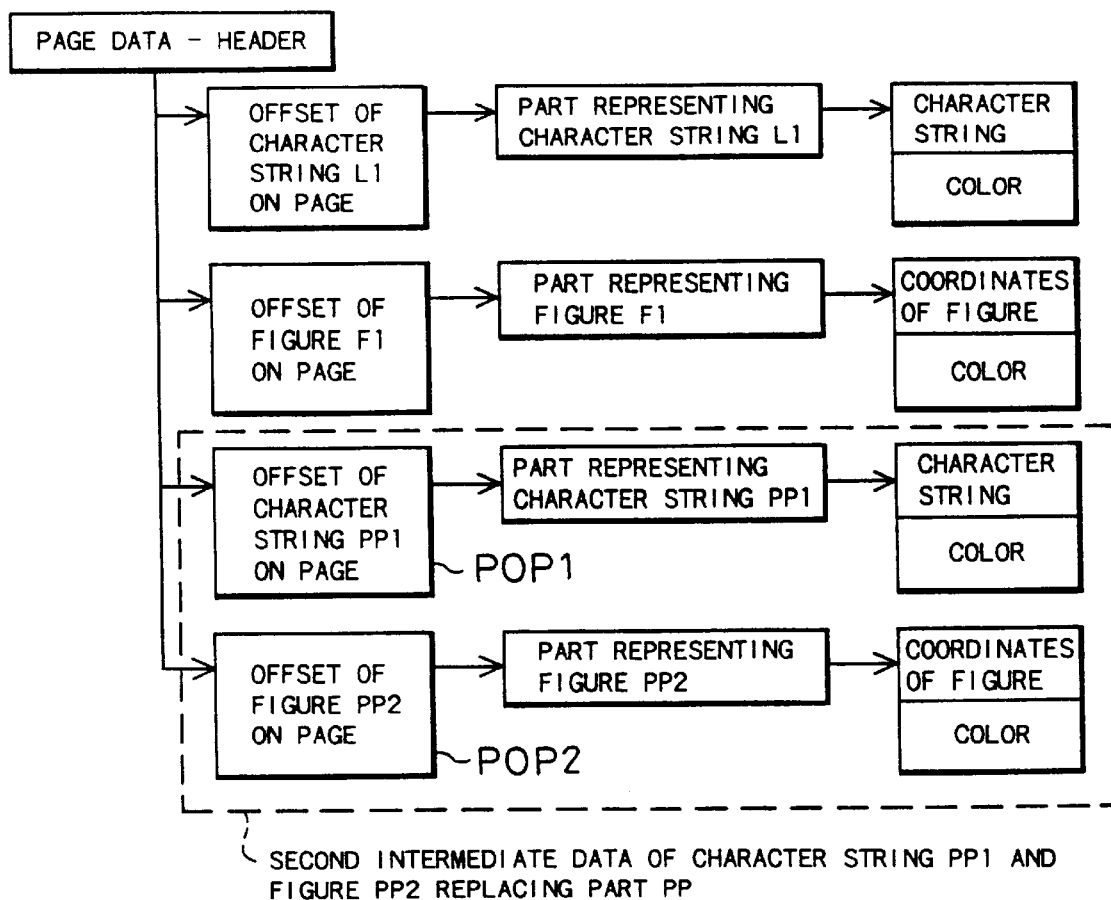
FIG. 9 illustrates an exemplified structure of the resulting third intermediate data in the second embodiment.

FIG. 8A illustrates an exemplified structure of the first intermediate data processed by the image-integrating applications program in the second embodiment. FIG. 8B illustrates an exemplified structure of the second intermediate data of the part PP generated by the link applications program in the second embodiment. FIG. 9 illustrates an exemplified structure of the resulting third intermediate data in the second embodiment. By way of example, as shown in FIG. 8A, one set of intermediate data has a 'header', 'parts offsets', 'parts element pointers', and 'parts attributive data' which are arranged hierarchically. In the example of FIG. 8A, a 'page data-header' includes pointers indicative of addresses of 'parts offsets' of the respective parts constituting a one-page image and attributive information of the one-page image, such as a page size and color information of the page. The 'parts offsets' include output positions (offsets) of the respective parts from the origin on the page and pointers indicative of addresses of 'parts element pointers' of the respective parts. The 'parts element pointers' include pointers indicative of addresses of 'parts attributive data' of the respective parts as well as information on size and rotation of the respective parts. The 'parts attributive data' include data representing each character string, the coordinates of each figure, and colors of the respective parts. The intermediate data are hierarchically structured in this manner. As shown in the lower portion of FIG. 8A, the 'parts attributive data' in the intermediate data of the part PP generated by the link applications program include only the coordinates of a frame, in which the part PP is inserted, and link information of the link applications program, and do not have any data representing an image of the part PP. The data representing an image of the part PP are included in the second intermediate data generated by the link applications program as shown in FIG. 8B.

In this embodiment, the combining unit 66 combines the first intermediate data processed by the image-integrating applications program with the second intermediate data of the part PP generated by the link applications program. In accordance with a concrete procedure, an offset POP1 of the character string PP1 on the page and an offset POP2 of the figure PP2 on the page shown in FIG. 9 are calculated from an offset PO of the part PP on the page shown in FIG. 8A and offsets OPP1 and OPP2 of the character string PP1 and the figure PP2 on the part PP shown in FIG. 8B. The data constituting the respective parts are kept in a fixed arrangement in the intermediate data, so that the data of the respective parts can be processed separately.

Referring back to FIG. 7, the combining unit 66 converts the meta-objects output from the link applications program to the second intermediate data of the respective parts (that is, the character string PP1 and the figure PP2). The combining unit 66 then adds the second intermediate data representing the character string PP1 and the figure PP2 after the first intermediate data representing the character string L1 and the figure F1 sent from the image-integrating applications program-based data processing unit 62, in order to combine them. Referring back to FIG. 8A, in the first intermediate data sent from the image-integrating applications program-based data processing unit 62 to the combining unit 66, the intermediate data of the part PP include the offset PO of the part PP on the page, information on the frame, and link information of the link applications program. In the combining process, a variety of data processing operations including calculation of offsets mentioned above are carried out using the intermediate data of the character string PP1 and the figure PP2 shown in FIG. 8B and the intermediate data of the part PP. These data processing operations replace the intermediate data of the part PP by the intermediate data of the character string PP1 and the figure PP2. The resulting intermediate data of the respective parts L1, F1, PP1, and PP2 are arranged in this sequence as shown in FIG. 9. The resulting intermediate data are further converted to PDL data for output.

As discussed above, the structure of the second embodiment readily implements the data processing by utilizing intermediate data in the data output process, and exerts the same effects as those of the first embodiment. In the process of outputting page data of a one-page image generated by the image-integrating applications program, the structure of the second embodiment can accurately reproduce and incorporate the parts data generated by the link applications program in the one-page image.

C. Third Embodiment

Structure of a third embodiment is especially effective for outputting a one-page image with special image processing effects, which are given between a part generated by the image-integrating applications program and another part generated by the link applications program. The 'image processing effects' denote processes having predetermined effects on parts, such as 'overlaying' and 'color framing', and effects by such processes. The 'overlaying' is a process of generating an overlapped area of images R1 and R2 on the border between the images R1 and R2 as shown in FIG. 10A, in order to prevent a dropout from occurring between the images in multicolor printing. The 'color framing' is a process of framing an image with a specific color, in order to make the contour of the image prominent, for example, in case that an image B (character) lays over an image A as shown in FIG. 10B.

Figure 11:
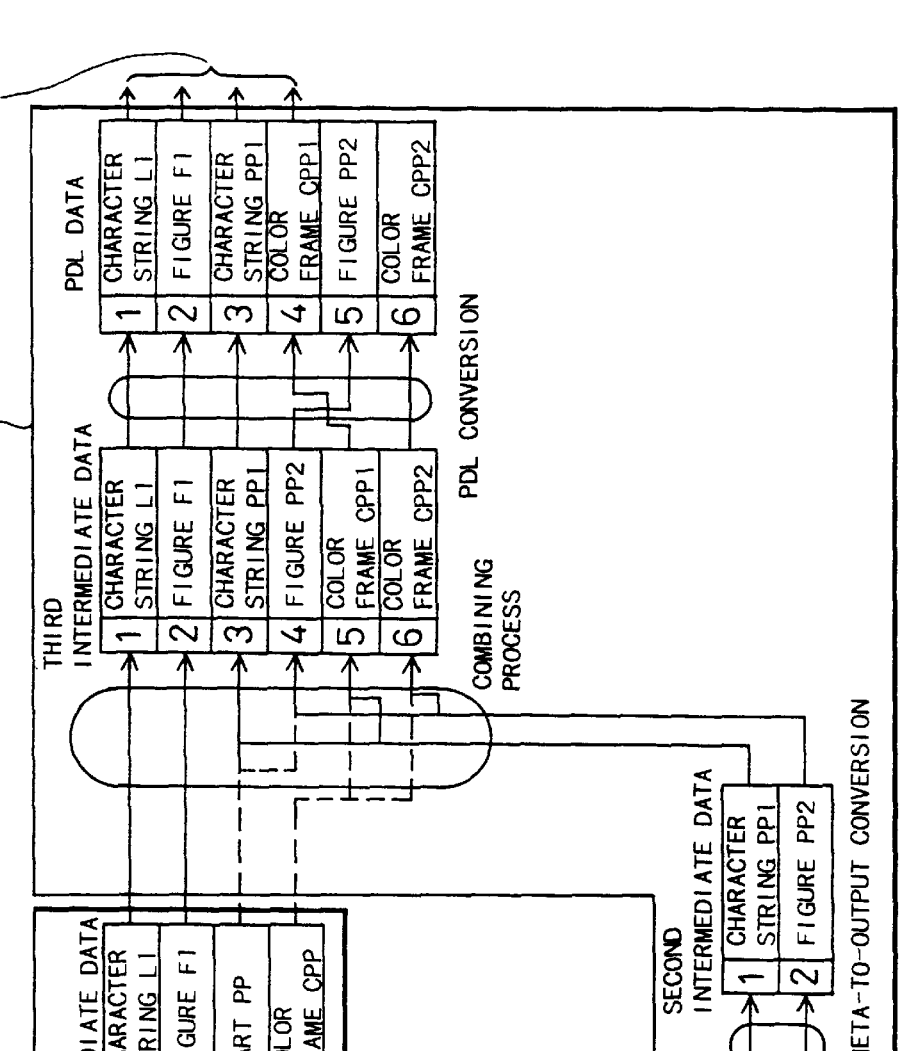
FIG. 11 shows a detailed flow of data in the page data output process carried out at step S2 in the flowchart of FIG. 3 in the third embodiment.
Figure 12A:
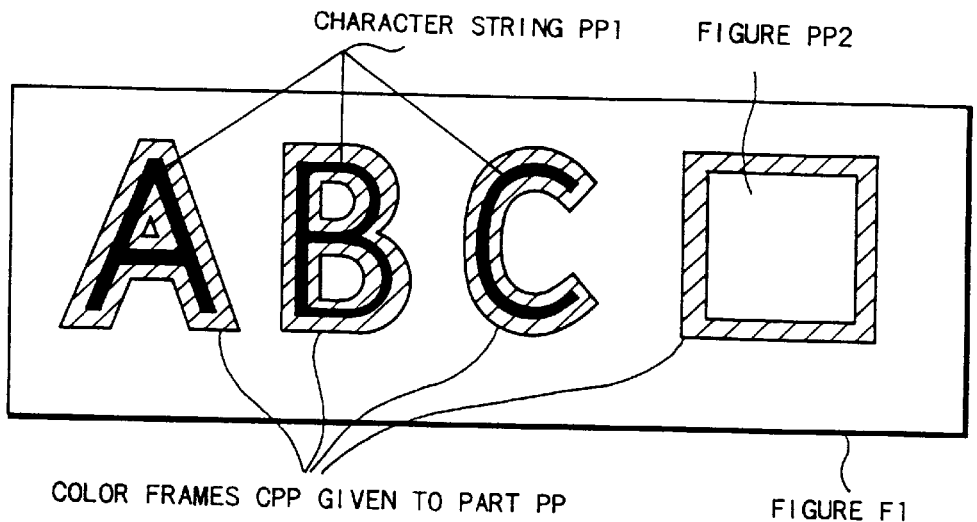
FIGS. 12A, 12B, and 12C show the image processing effect 'color framing' on the one-page image shown in FIG. 5.

FIG. 11 shows a detailed flow of data in the page data output process carried out at step S2 in the flowchart of FIG. 3 in the third embodiment. FIG. 11 refers to an embodiment where color frames CPP shown in FIG. 12A are given to the part PP (that is, the character string PP1 and the figure PP2) included in the one-page image shown in FIG. 5.

When the user gives an instruction to print out a one-page image, the units 62, 64, 66 generate and output page data representing the one-page image in the same manner as discussed in the second embodiment. The output process of the character string L1, the figure F1, and the part PP is identical with that of the second embodiment and is thus not specifically described here. The following describes the output process of the image processing effect 'color framing'.

Figure 13:
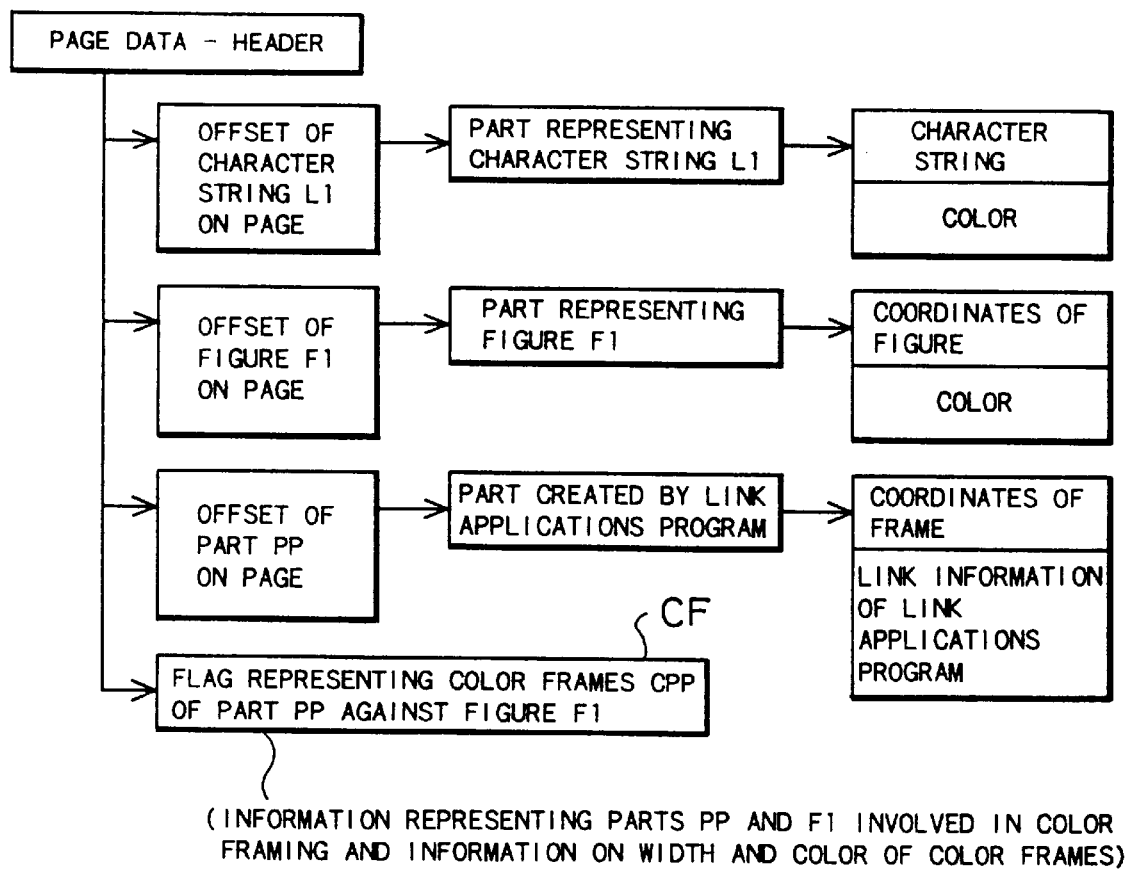
FIG. 13 illustrates an exemplified structure of first intermediate data processed by the image-integrating applications program in the third embodiment.

Referring to FIG. 13, in case that the image processing effect of 'color framing' is applied, the intermediate data output from the image-integrating applications program-based data processing unit 62 include a flag CF representing 'color frames' CPP other than the first intermediate data shown in FIG. 8A. The flag CF representing the 'color frames' CPP includes information indicating the parts PP and F1 involved in the 'color framing' and information indicating a width and color of the 'color frames'. Referring back to FIG. 11, in the process of combining the first intermediate data of the character string L1 and the figure F1 by the image-integrating applications program with the second intermediate data of the character string PP1 and the figure PP2 by the link applications program, the combining unit 66 generates a flag CF1 representing 'color frames' CPP1 regarding the character string PP1, and a flag CF2 representing a 'color frame' CPP2 regarding the figure PP2 from the flag CF of the 'color frames' CPP. These flags CF1 and CF2 are arranged after the respective parts data in the resulting intermediate data.

Figure 12B:
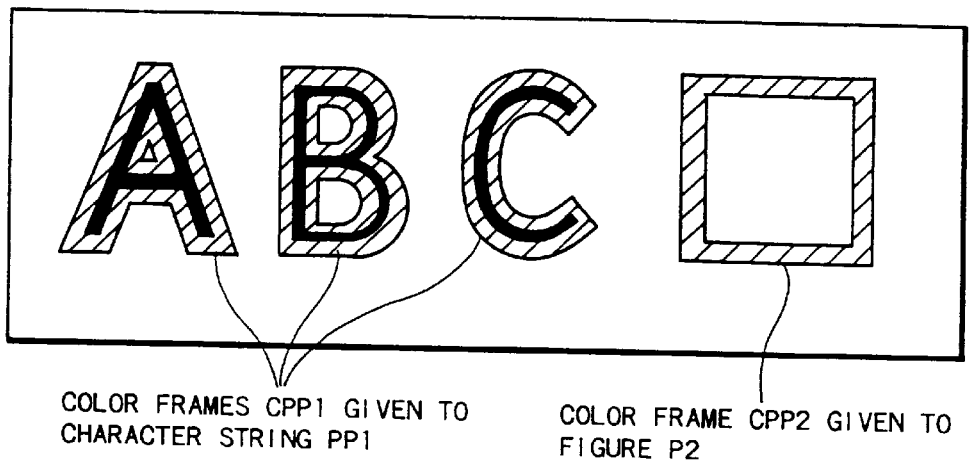
Figure 12C:
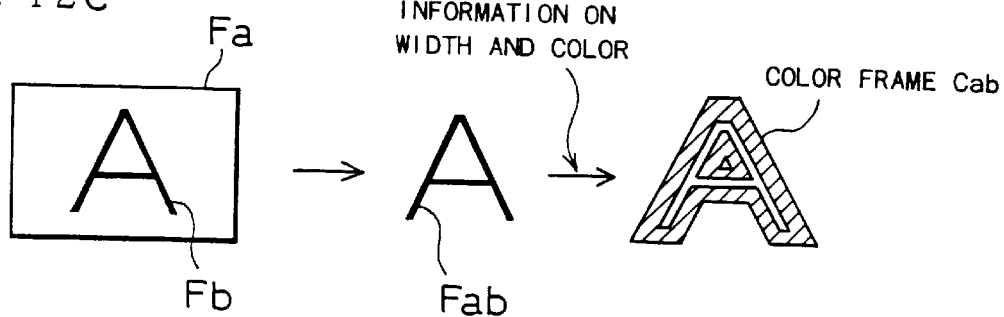
Figure 14:
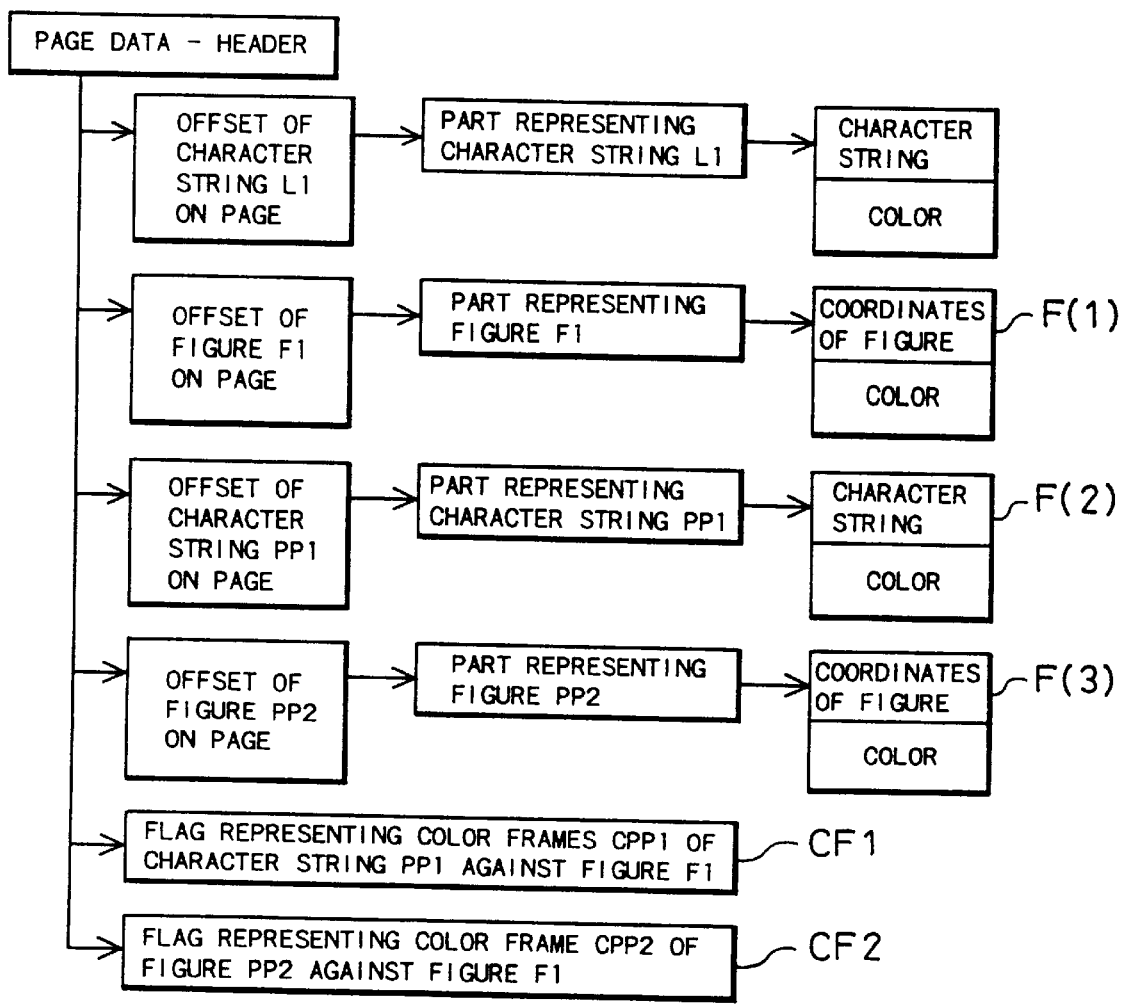
FIG. 14 illustrates an exemplified structure of the resulting third intermediate data in the third embodiment.

FIG. 14 illustrates an exemplified structure of the resulting third intermediate data in the third embodiment. The flag CF1 representing the 'color frames' CPP1 includes information indicating the character string PP1 and the figure F1 involved in 'color framing' and information indicating a width and color of the 'color frames'. The flag CF2 representing the 'color frame' CPP2 includes information indicating the figure PP2 and the figure F1 involved in 'color framing' and information indicating a width and color of the 'color frame'. The combining unit 66 further converts the resulting third intermediate data to PDL data. When detecting the flag CF1 representing the 'color frames' CPP1 of the character string PP1 and the flag CF2 representing the 'color frame' CPP2 of the figure PP2 in the process of PDL conversion, the combining unit 66 generates the 'color frames' CPP1 of the character string PP1 and the 'color frame' CPP2 of the figure PP2 as shown in FIG. 12B. A concrete procedure extracts the shape of a target portion Fab of the 'color framing' operation from two parts Fa and Fb involved in the 'color framing' operation, and generates a 'color frame' area Cab based on the extracted target portion Fab and information on width and color of the 'color frame' as shown in FIG. 12C. When the flag CF1 representing the 'color frames' CPP1 of the character string PP1 is detected in the process of converting the resulting intermediate data shown in FIG. 14 to the PDL data, the target parts F1 and PP1 of the image processing effect are specified according to the parts information included in the flag CF1. The target portion Fab of the 'color framing' operation (see FIG. 12C) is extracted from coordinates F(1) of the target figure F1 and character string data F(2) of the target character string PP1. The 'color frames' CPP1 of the PDL-converted character string PP1 are then generated based on the target portion Fab and the information on width and color of the 'color frames' in the flag CF1. The 'color frame' CPP2 for the figure PP2 is generated in a similar manner. When the flag CF2 representing the 'color frame' CPP2 of the figure PP2 is detected, a target portion of the 'color framing' operation is extracted from the coordinates F(1) of the target figure F1 and coordinates F(3) of the target figure PP2 shown in FIG. 14. The 'color frame' CPP2 of the PDL-converted figure PP2 is then generated based on the target portion and the information on width and color of the 'color frame' in the flag CF2. The PDL data of each 'color frame' thus generated is arranged as shown in FIG. 11 and output after the target part of the 'color framing' operation.

The operation of incorporating the special image processing effect may be carried out for parts-describing data, such as the meta-objects and the PDL data. In the meta-objects and PDL data, however, partitions of parts data are not readily distinguishable. The contents of processing are elucidated only after the analysis of all the data of the one-page image. An interpreter is accordingly required to output a one-page image with the image processing effects in the meta-objects and the PDL data. This makes the processing undesirably complicated. The third embodiment, on the other hand, deals with the intermediate data having the hierarchical structure, thereby readily giving the image processing effects to the parts as discussed above.

Figure 15:
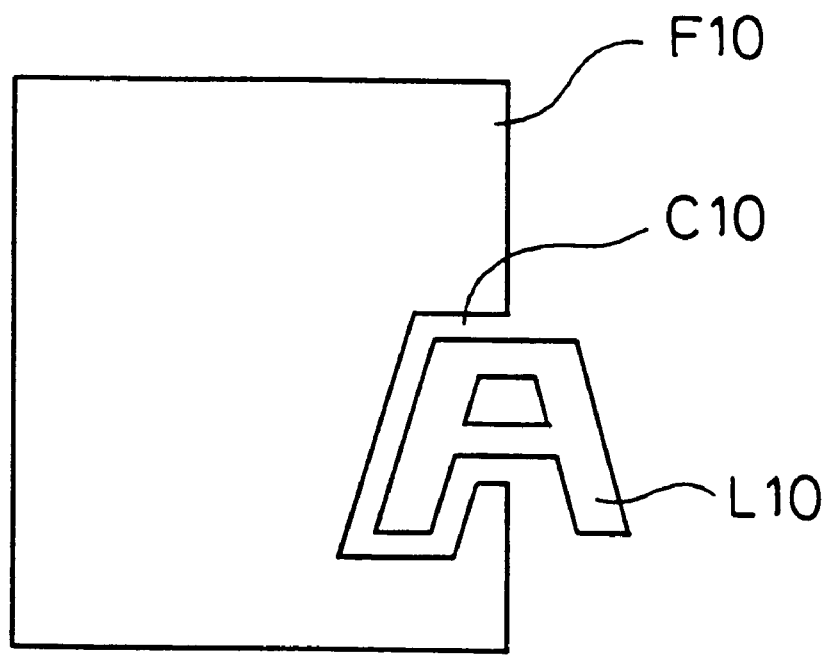
FIG. 15 shows an example of image processing effect that can not be expressed by PDL data.

FIG. 15 shows an example of image processing effect that can not be expressed by PDL data. In the example of FIG. 15, a letter L10 is laid upon the boundary of a tint figure F10 (a figure filled with an uniform color). A 'white frame' C10 is set around the letter L10 as the image processing effect. The right half of the letter L10 is protruded outside the tint figure F10, and the 'white frame' C10 is formed only around the portion of the letter L10 inside the tint figure F10. The PDL can directly describe the image processing effect, such as forming a 'white frame' around the whole contour of the letter L10, as an attribute of the letter L10, but can not describe the image processing effect, such as forming a 'white frame' around only the part of the letter L10 as shown in FIG. 15, as an attribute of the letter L10. The structure of the third embodiment, on the other hand, converts the image processing effect as shown in FIG. 15 from the internal data to the intermediate data and describes the image processing effect in the format of PDL data as an independent part. This structure enables the image processing effect that can not be described as an attribute of a part as shown in FIG. 15 to be output in the form of PDL data.

The structure of the third embodiment enables a highly precise output of a one-page image with the image processing effects faithfully reflected.

The present invention is not restricted to the above embodiments or its modified examples, but there may be many modifications, changes, and alterations without departing from the scope or spirit of the main characteristics of the present invention. Some examples of possible modification are given below.

(1) In the first through the third embodiments, meta-objects in a metafile format are used as an example of the parts-describing data output from the link applications program. The principle of the present invention is, however, not restricted to these meta-objects. The parts-describing data applicable to the present invention are any parts-describing data that do not depend upon the output device and enable faithful outputs of characters as fonts and figures as vectors and an output of pictures with the varied resolution according to the requirements.

(2) The intermediate data used in the second and the third embodiments may have a variety of structures other than the data structure shown in FIG. 14. The applicable intermediate data are any file data that have a common data structure, which is obtained by converting data generated by the image-integrating applications program and by converting other data generated by the link applications program, and which enable the respective parts data to be processed in parallel.

(3) Although the 'color framing' operation is described as an example of the image processing effect in the third embodiment, arbitrary image processing effects may be given to the parts.

It should be clearly understood that the above embodiments are only illustrative and not restrictive in any sense. The scope and spirit of the present invention are limited only by the terms of the appended claims.

What is claimed is:

1. A method of outputting page data representing a one-page image in a format of PDL data, said method comprising the steps of:

provided a one-page image data representing a one-page image generated by a first applications program, said one-page image including a first image part processed by said first applications program and a second image part processed by a second applications program, said one-page image data including link information indicative of a linkage between said second image part and said second applications program;

generating, by means of said first applications program, first parts-describing data from said one-page image data generated by said first applications program representing said one-page image, said first parts-describing data describing an image of said first image part;

when said first applications program detects the existence of said second image part in said one-page image data, giving an instruction to said second applications program through said linkage to generate second parts-describing data for describing an image of said second image part;

generating, by means of said second applications program, said second parts-describing data describing the image of said second image part in response to the instruction; and generating one-page PDL data representing said one-page image based on said first parts-describing data and said second parts-describing data.

2. A method in accordance with claim 1, wherein said step (d) comprises the step of:

generating a PDL data section for said second image part to be incorporated in the one-page PDL data, based on information indicative of said second image part in said one-page image as well as on said second parts-describing data, said information being output from said first applications program.

3. A method in accordance with claim 1, wherein said first parts-describing data have a data format of PDL data, and said second parts-describing data have a data format of a metafile, and wherein said step (d) comprises the steps of:

converting said second parts-describing data to a PDL data section; and generating said one-page PDL data by arranging a PDL data section corresponding to said first parts-describing data and the PDL data section of said second image part.

4. A method in accordance with claim 1, wherein said first parts-describing data are first parts intermediate data having a predetermined intermediate data format, which is different from the format of the PDL data, and said second parts-describing data have a data format of a metafile, and wherein said step (d) comprises the steps of:

(1) converting said second parts-describing data to second parts intermediate data having the predetermined intermediate data format;

(2) generating page image intermediate data representing said one-page image by arranging said first parts intermediate data and said second parts intermediate data; and (3) converting said page image intermediate data to said one-page PDL data.

5. A method in accordance with claim 4, wherein said first parts intermediate data comprise information indicative of said second image part in said one-page image, and wherein said step (2) comprises the step of:

generating said second parts intermediate data included in said page image intermediate data, based on the information indicative of said second image part in said first parts intermediate data, as well as on said second parts intermediate data.

6. A method in accordance with claim 4, wherein said internal data representing said one-page image comprise image processing effect information representing a predetermined image processing effect given between said first image part and said second image part, and wherein said step (2) comprises the step of:

incorporating the image processing effect information into said page image intermediate data.

7. A page data output apparatus for outputting page data representing a one-page image in a format of PDL data, said page data output apparatus comprising:

a one-page image data representing a one-page image generated by a first applications program, said one-page image including a first image part processed by said first applications program and a second image part processed by a second applications program, said one-page image data including link information indicative of a linkage between said second image part and said second applications program;

first data processing means for generating first parts-describing data, which describe an image of said first image part, from said one-page image data of said first applications program representing said one-page image, and for, when the existence of said second image part in said one-page image data is detected, giving an instruction to said second applications program, through said linkage, to generate second parts-describing data for describing an image of said second image part;

second data processing means for generating said second parts-describing data describing the image of said second image part in response to the instruction; and combining means for generating one-page PDL data representing said one-page image based on said first parts-describing data and said second parts-describing data.

8. A page data output apparatus in accordance with claim 7, wherein said combining means comprises:

means for generating a PDL data section for said second image part to be incorporated in the one-page PDL data, based on information indicative of said second image part in said one-page image as well as on said second parts-describing data, said information being output from said first applications program.

9. A page data output apparatus in accordance with claim 7, wherein said first parts-describing data have a data format of PDL data, and said second parts-describing data have a data format of a metafile, and wherein said combining means comprises:

means for converting said second parts-describing data to a PDL data section; and means for generating said one-page PDL data by arranging a PDL data section corresponding to said first parts-describing data and the PDL data section of said second image part.

10. A page data output apparatus in accordance with claim 7, wherein said first parts-describing data are first parts intermediate data having a predetermined intermediate data format, which is different from the format of the PDL data, and said second parts-describing data have a data format of a metafile, and wherein said combining means comprises:

first means for converting said second parts-describing data to second parts intermediate data having the predetermined intermediate data format;

second means for generating page image intermediate data representing said one-page image by arranging said first parts intermediate data and said second parts intermediate data; and third means for converting said page image intermediate data to said one-page PDL data.

11. A page data output apparatus in accordance with claim 10, wherein said first parts intermediate data comprise information indicative of said second image part in said one-page image, and wherein said second means comprises:

means for generating said second parts intermediate data included in said page image intermediate data, based on the information indicative of said second image part in said first parts intermediate data, as well as on said second parts intermediate data.

12. A page data output apparatus in accordance with claim 10, wherein said internal data representing said one-page image comprise image processing effect information representing a predetermined image processing effect given between said first image part and said second image part, and wherein said second means comprises:
   means for incorporating the image processing effect information into said page image intermediate data.

13. A computer program product for processing an image, said computer program product comprising:

a computer readable medium; and a first applications program code means stored on said compute readable medium, said first applications program code means comprising:
   a one-page image data representing a one-page image generated by a first applications program, said one-page image including a first image part processed by said first applications program and a second image part processed by a second applications program said one-page image data including link information indicative of a linkage between said second image part and said second applications program;
   program code means for causing a computer to generate said one-page image data representing a one-page image, which comprise a first image part generated by said first applications program code means and a second image part generated by second applications program code means;
   program code means for causing said computer to generate first parts-describing data describing said first image part from said one-page image data;
   program code means for causing said computer to detect an image part included in said one-page image data;
   program code means for, when the existence of said second image part in said one-page image data is detected, causing said computer to give an instruction to said second applications program code means, through said linkage to generate parts-describing data describing an image of said second image part; and
   program code means for causing said computer to generate page description language-program data representing said one-page image based on second parts-describing data as well as on said first parts-describing data in response to the instruction said second parts-describing data describing the image of said second image part.

14. A method of outputting page data representing a one-page image described by a page description language, said method comprising the steps of:

(a) preparing one-page image data including a first object created by a first applications program and a second object created by a second applications program, said one-page data further including link information indicating what applications program generated said object;

(b) generating, by means of said first applications program, first object describing data from said one-page image data, said first object describing data describing a first part of said page data;

(c) when said first applications program detects the existence of said second object in said one-page image data, giving an instruction to said second applications program to generate second object describing data from said one-page image data, said second object describing data describing second part of said page data; and (d) combining said first object describing data with said second object describing data and outputting said combined data as said page data representing said one-page image.

* * * * *

UNITED STATES PATENT AND TRADEMARK OFFICE
CERTIFICATE OF CORRECTION

PATENT NO. : 5,970,219
DATED : October 19, 1999
INVENTOR(S) : Norihiko NAKAMURA

It is certified that error appears in the above-identified patent and that said Letter Patent is hereby corrected as shown below:

Column 12, line 56, before "generating" insert --(a)--;

line 62, before "when" insert --(b)--.

Column 13, line 1, before "generating" insert --(c)--;

line 5, before "generating" insert --(d)--.

Signed and Sealed this

Third Day of April, 2001

*Attest:*

NICHOLAS P. GODICI

*Attesting Officer*     *Acting Director of the United States Patent and Trademark Office*